Patented Jan. 14, 1941

2,228,987

UNITED STATES PATENT OFFICE 2,228,987

ETHERS OF FATTY ACID ESTERS

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application April 19, 1938,
Serial No. 202,986

12 Claims. (Cl. 260—404)

This invention relates to new products adapted for use as wetting, dispersing or emulsifying agents. It relates more particularly to new ethereal condensation products of partially esterified alkylolamines having at least one esterified hydroxyl group and at least one free hydroxyl group with partially esterified polyhydric alcohols, similarly having at least one esterified hydroxyl group and at least one free hydroxyl group; and it includes not only these new products, but also a new process for their preparation. The new products are quite stable and are highly effective in acid solution.

The new products of the present invention may be represented by the formula:

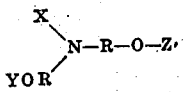

in which X is alkyl, aralkyl, alicyclic, alkylol, hydroxyalicyclic, esterified alkylol or hydroxyalicyclic, or aralkylol or esterified aralkylol; the R's represent alkyl, alicyclic or aralkyl, alike or different; Y is an acyl group (higher or lower) or, if X is an esterified alkylol, aralkylol or hydroxyalicyclic group, Y may be hydrogen or acyl, and Z is the residue of a partially esterified polyhydric alcohol, such as a mono- or diglyceride, or a mono-fatty acid ester of ethylene or propylene glycol, or a residue of the nature of polyglycerol, polyglycol, glycerol glycol, polyglycol glycerol, and polyglycerol glycol residues, having at least one alcoholic hydroxyl esterified by a fatty acid, advantageously a higher fatty acid corresponding to those occurring in natural fats or oils.

These new products are advantageously produced by reaction between the corresponding alkylolamine and partially esterified polyhydric alcohol, in accordance with the equation:

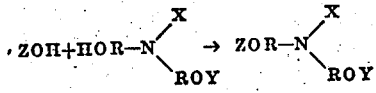

with elimination of water between an OH group of the alkylolamine and an OH group of the polyhydric alcohol, with formation of an ether. This reaction may be caused to take place by heating the constituents together to a temperature in excess of 100° C., advantageously above 160° C. but below the point of decomposition or volatilization of the constituents, for a relatively long period of time, for example, one or two days. If desired, a current of inert gas, such as dry nitrogen, may be passed through the reaction mixture to cause the reaction to proceed more rapidly.

The partially esterified alkylolamines used for the preparation of the new products of the present invention may be prepared in various ways. In general, they may be represented by the formula:

in which $R_1$, $R_2$ and $R_3$ are alkyl groups as herein defined, or substituted alkyl groups, which may be the same or different, at least one of which has at least one $R_4COO$ substituent ($R_4$ representing methyl or the carbon-linked chain of a fatty acid) and at least one of which has at least one OH (alcoholic hydroxyl) substituent, compounds having an $R_4COO$ substituent, and an OH substituent in the same substituted alkyl group, with the other alkyl groups substituted or unsubstituted, being included.

In this specification and the appended claims, the term "fatty acid" is used to designate broadly carboxylic acids of the aliphatic series, including both unsaturated and saturated acids as well as the substituted acids which may occur in natural fats or oils, such as ricinoleic acid, and modifications of the acids which occur in natural oils, such as those in blown or bodied oils; and the term "higher fatty acid" is used to designate those carboxylic acids, generally having at least 8 carbon atoms, which occur combined with glycerin in natural oils and fats. It is understood that the terms "alkylol" and "alkyl" are used conventionally in chemistry to refer to paraffin compounds which are non-cyclic and aliphatic in nature. We have found, however, that the alicyclic and hydroxyalicyclic, as well as the aralkyl and aralkylol amines are, with respect to the reactions involved in the various phases of the present invention, similar to the corresponding alkyl and alkylol amines, with the limitation that the aralkyl and aralkylol compounds have the linkage to the nitrogen atom in the side chain. For this reason, for the purpose of describing the present invention only, it is understood that the terms "alkyl" and "alkylol" include within their scope alicyclic, aralkyl, hydroxyalicyclic and aralkylol groups.

One advantageous method of preparing the partially esterified alkylolamines is that described in our application Serial No. 180,993, filed December 21, 1937, by reaction between a triglyceride of a fatty acid, or other ester of a fatty acid, and an alkylolamine having more than one alcoholic hydroxyl, the proportions of the ester and the alkylolamine being such that after replacement of the glycerin or other alcohol of the fatty acid ester used, there will be at least one free alcoholic hydroxyl in the esterified alkylolamine. Such alkylolamines, having at least one esterified hydroxyl group and at least one free hydroxyl group, are herein referred to as "partially esterified alkylolamines." The free alcoholic hydroxyl of the partially esterified amine is available for condensation with a corresponding hydroxyl group of a partially esterified polyhydric alcohol in accordance with the present invention, the term "partially esterified polyhydroxy alcohol" being similarly used to designate polyhydroxy alcohols having at least one esterified hydroxyl group and at least one free hydroxyl group. However, the preparation of the partially esterified alkylolamines which may be used is not limited to the procedure described in said prior application, as they may also be prepared by suitable reaction between an acyl halide, such as acyl chlorides, and a tertiary alkylolamine, or in other ways. Also, it is to be understood that the alkylolamines used in accordance with the present invention need not be esters of tertiary alkylolamines with the higher fatty acids, but include tertiary alkylolamines partially esterified with the lower fatty acids, such as acetic acid, propionic acid, butyric acid, etc.

Similarly, the partially esterified polyhydric alcohols used in accordance with the present invention may be prepared in any of the known ways, including the re-esterification of fats or oils by heating a polyhydric alcohol, such as glycerin or glycol with a fat or oil in the presence of a suitable catalyst, such as a basic salt; by the reaction of a fatty acid with a polyhydric alcohol in the presence of a suitable condensing agent, the proportions of fatty acid and polyhydric alcohol being regulated so that after the resulting esterification there remains a free alcoholic hydroxyl group in the major portion of the polyhydric alcohol residues, or in other ways.

A particularly advantageous method of preparing a mixture of partially esterified alkylolamine and partially esterified polyhydric alcohol for reaction to form the new ethereal products of the present invention is that described in our application Serial No. 191,964, filed February 23, 1938, in which a mixture of a fatty acid ester of a polyhydric alcohol, a polyhydric alcohol, and a tertiary alkylolamine having more than one alcoholic hydroxyl group are heated together for a sufficient period of time to permit substantial alcoholysis to take place, with the production of a product consisting predominantly of partially esterified tertiary alkylolamine and partially esterified polyhydric alcohol, with a certain amount of unreacted alkylolamine, unreacted polyhydric alcohol ester and unreacted polyhydric alcohol. Such a mixture is admirably adapted for the production of the new products of the present invention, as the new products are readily prepared by simple extended heating of the mixture.

Among the amines which may be partially esterified for use in the production of the new products of the present invention are a wide range of tertiary alkylol and tertiary alkyl alkylolamines. The two essentials are that the alkylolamine contain at least two alcoholic hydroxyl groups, which may be attached to the same or different carbon chains, and be a tertiary amine, that is, with three alkyl or alkylol groups linked through carbon atoms to the nitrogen atom. Included among the suitable amines are triethanolamine, diethanolalkylamines, such as diethanolethylamine, diethanolpropylamine, etc., tertiary glyceryl amines, such as tri-dihydroxypropylamine, dihydroxypropyldialkylamines, such as dihydroxypropyldiethylamine, tripropanolamine, dipropanolmethylamine, cyclohexanoldiethanolamine, di-cyclohexanolethylamine, etc. All such products may be readily prepared by known processes, and all of them are tertiary amines having at least two alcoholic hydroxyl groups, thus being adapted to form esters with higher fatty acids, such esters having at least one free hydroxyl group. Typical of the amines which may be used are the following:

$(C_2H_4OH)_3N$
Triethanolamine $(C_2H_4OH)$
$(C_2H_4OH)-N$
$(C_2H_5)$
Diethanolethylamine $(C_2H_4OH)$
$(C_2H_4OH)-N$
$(CH_3)$
Diethanolmethylamine $[C_3H_5(OH)_2]_3N$
Tri-dihydroxypropylamine (triglycerylamine)

$[C_3H_5(OH)_2]$
$[C_3H_5(OH)_2]-N$
$(C_2H_5)$
Di-dihydroxypropylethylamine (diglycerylethylamine)

$[C_3H_5(OH)_2]$
$(C_2H_5)-N$
$(C_2H_5)$
Dihydroxypropyldiethylamine (glyceryl diethylamine)

$(C_3H_6OH)_3N$
Tripropanolamine $(C_3H_6OH)$
$(C_3H_6OH)-N$
$(C_2H_5)$
Di-propanolethylamine $[C_2H_4(C_6H_5)OH]$
$[C_2H_4(C_6H_5)OH]-N$
$(C_2H_5)$
Di-phenylpropanolethylamine $(C_2H_4OH)$
$(C_2H_4OH)-N$
$(C_6H_{11}OH)$
Cyclohexanoldiethanolamine $(C_6H_{10}OH)$
$(C_6H_{10}OH)-N$
$(C_2H_5)$
Dicyclohexanolethylamine $(C_4H_9OH)_3N$
Tributanolamine $(C_4H_9OH)$
$(C_4H_9OH)-N$
$(C_2H_4OH)$
Dibutanolethanolamine $(C_4H_9OH)$
$(C_4H_9OH)-N$
$CH_3$
Dibutanolmethylamine Any of the available partially esterified polyhydric alcohols may be used in the production of the new compositions in accordance with the present invention. Products produced by the use of mono- or diglycerides, superglycerinated fats, or the like have important advantages. Mono- or diglycerides may be readily produced by the re-esterification or superglycerination of naturally occurring triglycerides, including such vegetable oils as cocoanut and palm kernel oil, olive oil, castor oil, palm oil, peanut oil, the drying and semi-drying oils such as corn oil, rape seed oil, soya bean oil, sunflower seed oil, linseed oil, perilla oil, etc., as well as animal and marine oils, such as tallow, sardine oil, menhaden oil, etc., with glycerin. Blown or bodied oils, such as blown castor oil, blown rape seed oil or perilla oil, bodied linseed oil, etc., may also be used, these oils having somewhat different properties from those of the original oils from which they are derived. Castor oil and blown castor oil yield products having somewhat special characteristics due to the presence of oxygen in the long hydrocarbon chain characteristic of the fatty acids.

Partially esterified polyhydric alcohols useful in producing the new products of the present invention may also be produced by the re-esterification of such triglycerides as those listed above with polyhydric alcohols other than glycerin, such as ethylene glycol, propylene glycol, polyglycerols, polyglycols, glyceryl glycol ethers, glycol ethers, glycerol polyglycol ethers, etc. In general, such production of the partially esterified polyhydric alcohols is accomplished by heating the triglycerides with the desired polyhydric alcohol in the presence of a suitable catalyst, in accordance with well known practice. However, the partially esterified polyhydric alcohols which may be used are not limited to those in which the fatty acid group is that of a higher, naturally occurring fatty acid such as occurs in natural fats and oils, but includes polyhydric alcohols partially esterified by the lower fatty acids, such as acetic acid, propionic acid, etc. Thus for example, partially esterified polyhydric alcohols useful in carrying out the present invention may be prepared from triacetin, or from a polyhydric alcohol and acyl chlorides, such as acetyl chloride, or in other suitable ways, as from a chlorhydrin and a suitable fatty acid.

If the partially esterified polyhydric alcohol, or the partially esterified alkylolamine, has more than one free alcoholic hydroxyl group, more complex condensation products may be produced in the course of the reaction, as by the condensation of one molecule of a partially esterified alkylolamine having more than one free hydroxyl group with one molecule of partially esterified polyhydric alcohol and one molecule of the amine, or with two molecules of the partially esterified polyhydric alcohol; or one molecule of the partially esterified polyhydric alcohol, having more than one free hydroxyl group, such as a monoglyceride, may condense with two molecules of the amine. In any case, the resulting condensation products are ethereal derivatives of the initial starting material.

The invention will be further illustrated by the following specific examples, although it is not limited thereto.

*Example 1.*—Commercial triethanolamine, cocoanut oil and glycerin in the proportions of one mole of cocoanut oil to three moles of triethanolamine and at least one mole of glycerin are heated to a temperature of between about 150 and 180° C. for a period of about fifty hours. If desired, a current of dry nitrogen may be passed through the reaction mixture. The resulting product contains a substantial and preponderating amount of the ether resulting from the condensation of the mono-fatty acid ester of triethanolamine and the mono- and di-fatty acid ester of glycerin, shown in the following formula:

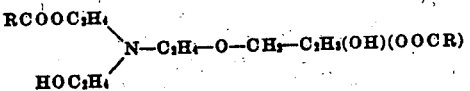

in which R represents the long carbon linked chain of the cocoanut oil fatty acids.

The product has extremely good wetting, emulsifying and detergent properties, is highly effective in acid solution and shows good resistance to alkalies.

*Example 2.*—Triglycerylamine (tri-dihydroxypropylamine) and castor oil are reacted in the proportions of three moles of castor oil to two moles of triglycerylamine, for a period of about two hours at a temperature of around 150 to 180° C. To the product so produced, which consists predominantly of the di-ricinoleic acid ester of the triglycerylamine is added about 50% of the mono-ricinoleic acid ester of glycerin, and the resulting mixture is heated to about 150 to 180° C. for about two days, with the production of mixed ethers of the di-ricinoleic acid ester of triglycerylamine and the mono-ricinoleic acid ester of glycerin, of the type formula:

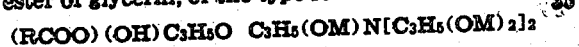

in which two of the M's represent the acyl group corresponding to ricinoleic acid and the other three represent hydrogen, and in which R represents the carbon linked chain characteristic of ricinoleic acid.

*Example 3.*—Palm kernel oil and diethanolethylamine, in the molecular proportions of three moles of the amine to one mole of the palm kernel oil are heated together with one mole of a polyglycerol to a temperature between about 150 and 180° C. for about two days with the production of a reaction product containing a large proportion of the ether of the mono-fatty acid ester of diethanolethylamine and the monoglyceride corresponding to palm kernel oil, and a large proportion of the ether of the same diethanolethylamine ester and the mono-fatty acid ester of the polyglycerol.

*Example 4.*—An equimolecular mixture of the monoacetic acid ester of triethanolamine and the mono-stearic acid ester of glycerin are heated together for a period of about fifty hours, with the production of a product containing substantial amounts of the ether of the formula:

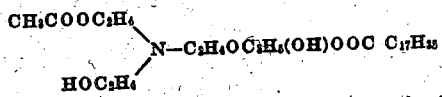

together with more complex ethereal derivatives of the amine and the monoglyceride.

*Example 5.*—Commercial triethanolamine, a fatty oil and ethylene glycol in the molecular proportions of two moles of the amine to one mole of the oil to one mole of the ethylene glycol are heated to a temperature between about 150 and 180° C. for about two days with the production of a reaction product containing substantial amounts of the ether of the mono-ester of triethanolamine with the corresponding mono-glyceride and the ether of the mono-ester of triethanolamine with the mono-ester of ethylene glycol.

The foregoing examples illustrate the production of certain of the new products of the present invention. In place of the partially esterified tertiary alkylolamine of the examples, any other available tertiary alkylolamines having at least one esterified hydroxyl group and at least one free hydroxyl group, such as the products obtained by the partial esterification of the polyhydroxy alkylolamines previously referred to may be used; while in place of the partially esterified polyhydric alcohols of the examples, other partially esterified polyhydric alcohols may be used; including those previously referred to. In general, ethers derived from mono- or di-glycerides and partially esterified tertiary alkylolamines, particularly triethanolamine, have important advantages.

We claim:

1. Ethers of partially esterified tertiary alkylolamines with partially esterified polyhydric alcohols.

2. Ethers of partially esterified tertiary alkylolamines with compounds of the class consisting of mono- and diglycerides of fatty acids.

3. Ethers of partially esterified triethanolamines with partially esterified polyhydric alcohols.

4. Ethers of partially esterified triethanolamines with compounds of the class consisting of mono- and diglycerides.

5. Ethers of mono-fatty acid esters of tertiary alkylolamines having more than one hydroxy group with partially esterified polyhydric alcohols.

6. Ethers of mono-fatty acid esters of triethanolamine with compounds of the class consisting of mono- and diglycerides.

7. Ethers of mono-fatty acid esters of triethanolamine with compounds of the class consisting of mono- and diglycerides of higher fatty acids.

8. Ethereal reaction products of partially esterified tertiary alkylolamines and partially esterified polyhydric alcohols.

9. Ethereal reaction products of compounds of the class consisting of mono- and diglycerides with mono-fatty acid esters of triethanolamine.

10. Ethereal reaction products of compounds of the class consisting of mono- and diglycerides with di-fatty acid esters of triethanolamine.

11. The process of preparing wetting, emulsifying and dispersing agents which comprises heating a triglyceride, a tertiary alkylolamine having more than one alcoholic hydroxyl and a polyhydric alcohol to a temperature in excess of 100° C. for a period of time sufficient to cause alcoholysis of the triglyceride and condensation between the resulting partially esterified alkylolamine and partially esterified glycerin.

12. The process of preparing wetting, emulsifying and dispersing agents which comprises heating a partially esterified tertiary alkylolamine with a partially esterified polyhydric alcohol for a period of time sufficient to effect condensation of the said alcohol with the said amine, with the production of an ethereal reaction product.

MELVIN DE GROOTE.
BERNHARD KEISER.
CHARLES M. BLAIR, Jr.